US006838512B2

(12) United States Patent
Eggers et al.

(10) Patent No.: US 6,838,512 B2
(45) Date of Patent: Jan. 4, 2005

(54) COLD SHRINK FLUOROELASTOMERIC ARTICLE

(75) Inventors: Robert E. Eggers, Arden Hills, MN (US); James C. Margl, Houlton, WI (US); Steven D. Yau, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/455,577

(22) Filed: Jun. 5, 2003

(65) Prior Publication Data

US 2004/0249054 A1 Dec. 9, 2004

(51) Int. Cl.$^7$ .................................. C08K 9/06
(52) U.S. Cl. ................ 524/544; 524/365; 524/413; 524/423; 525/244
(58) Field of Search ................. 524/544, 365, 524/413, 423; 525/244

(56) References Cited

U.S. PATENT DOCUMENTS

| | | | |
|---|---|---|---|
| 4,363,842 A | | 12/1982 | Nelson |
| 4,690,994 A | * | 9/1987 | Masuda et al. ............. 526/254 |
| 5,080,942 A | | 1/1992 | Yau |
| 5,110,645 A | * | 5/1992 | Matsumoto et al. ....... 428/36.9 |
| 5,216,085 A | | 6/1993 | Guenthner et al. |
| 5,218,026 A | * | 6/1993 | Toda et al. ................. 525/255 |
| 5,284,611 A | * | 2/1994 | Grootaert et al. ........... 264/135 |
| 5,430,103 A | * | 7/1995 | Ohata et al. ................ 525/194 |
| 5,527,858 A | | 6/1996 | Blong et al. |
| RE36,794 E | | 7/2000 | Grootaert |
| 6,111,200 A | * | 8/2000 | De Schrijver et al. .... 174/74 A |
| 6,207,758 B1 | | 3/2001 | Brinati et al. |
| 6,242,548 B1 | | 6/2001 | Duchesne et al. |
| 6,410,630 B1 | * | 6/2002 | Hoover et al. .............. 524/365 |
| 6,489,420 B1 | | 12/2002 | Duchesne et al. |
| 6,747,110 B2 | * | 6/2004 | Rajagopalan ............... 526/254 |

OTHER PUBLICATIONS

Odian, George G., "Principles of Polymerization", 1991 edition, Wiley. See pages 19–24.*

* cited by examiner

Primary Examiner—David W. Wu
Assistant Examiner—Henry S. Hu
(74) Attorney, Agent, or Firm—Yen Tong Florczak

(57) ABSTRACT

A cold shrink article including a fluoroelastomer composition comprising a first fluoroterpolymer having a weight average molecular weight centered from about $10^7$ to about $10^8$. A second fluoroterpolymer included in the fluoroelastomer composition has a weight average molecular weight centered at $10^4$. The first fluoroterpolymer combines with the second fluoroterpolymer to provide a mixed terpolymer. Other components of the fluoroelastomer composition include a processing aid, a filler, an oil, and a curative. The fluoroelastomer composition upon curing at an elevated temperature provides the cold shrink article that has a permanent set value of 21% or less.

16 Claims, No Drawings

COLD SHRINK FLUOROELASTOMERIC ARTICLE

BACKGROUND OF THE INVENTION

1. Field of the Invention

The invention relates to durable cold-shrink articles formed from a highly flexible fluoroelastomer composition that resists attack and contamination by chemical and biological agents. More particularly the present invention provides fluorinated terpolymer compositions including monomers of tetrafluoroethylene, hexafluoropropylene and vinylidene difluoride. The fluorinated terpolymer compositions cure under selected conditions to provide a range of terpolymers varying in molecular weight. Multimodal mixed terpolymers, containing two or more terpolymers differing in molecular weight, may be formulated to satisfy cold-shrink product properties including, for example, tensile, elongation and permanent set.

2. Description of the Related Art

Elastomer materials have been developed for an impressive array of product applications. Of particular interest, for protecting and repairing signal and current carrying wires and cables, is a group of materials known generally as cold-shrink materials that provide highly elastic tubular structures. A conventional cold-shrink product typically comprises a flexible tube of an elastomer, such as EPDM rubber, held in expanded condition on a support core designed for removal from inside the flexible tube. The support core collapses on demand to allow the tube to shrink into contact with a wire or cable that needs protecting. Conventional cold-shrink products have limitations because inherent properties of currently used elastomers exclude them from use at high temperatures as barriers to aggressive, contaminating chemical and biological materials.

An answer to containment of biological and chemical hazards lies in the use of elastomers containing fluorine that belong to a group called fluoroelastomers. A number of investigators have confirmed that chemical resistance is a property of fluoroelastomers. For example, U.S. Pat. No. 4,690,994 describes a fluoroelastomer having advantages in common with conventional fluoroelastomers such as excellent heat resistance and chemical resistance. The same fluoroelastomer further shows excellent mechanical properties such as tensile strength and elongation, compression set, rebound resilience, processability, and resistance to the formation and growth of cracks.

U.S. Pat. No. 5,218,026, refers to a vulcanizable, fluorine containing elastomer composition which can be used to produce articles requiring high resistance to chemicals and solvents, such as fuel hoses, valves and O-rings, which are highly resistant to extraction when immersed in a fuel oil. This fluorine-containing elastomer composition has a molecular weight distribution exhibiting a plurality of peaks. According to U.S. Pat. No. 6,489,420, fluoroelastomers with high fluorine content have excellent permeation resistance to fuels. The fluoropolymer serves as a chemically resistant or vapor impermeable barrier.

In some cases the fluoroelastomer compositions have been manipulated to include a bimodal or multimodal distribution of molecular weights. U.S. Pat. No. 4,690,994 discusses a fluoroelastomer that has a bimodal molecular weight distribution of which the ratio ($h_2/h_1$) is in the range of 0.8 to 4.0. The ratio $h_2/h_1$, affects the balance of processability, mechanical properties, compression set and resistance to the formation and growth of cracks. An exemplary fluoroelastomer has a bimodal molecular weight distribution, which is composed of a higher molecular weight component and a lower molecular weight component. The weight average molecular weights (Mw) of these two components are in the range of $50-250 \times 10^4$ and $5-50 \times 10^4$ corresponding to the higher molecular weight component and lower molecular weight component respectively.

The value of multimodal molecular weight distribution is further described in U.S. Pat. No. 5,218,026 with regard to a fluorine-containing elastomer having a high molecular weight fraction that contributes to the mechanical properties of a molded article and a low molecular weight fraction contributing to the processability of the composition. In one embodiment, the content of fractions having a molecular weight not greater than 10,000 ($M_1$) in the elastomer is preferably less than 15% by weight. The content of polymer fractions having a molecular weight of 2,000,000 or more (M200) in the elastomer is preferably in the range from 4-10% by weight.

U.S. Pat. No. 6,242,548 clarifies the term "multimodal terpolymer" to mean a terpolymer having two or more discrete molecular weight ranges. The multimodal terpolymer has a relatively low molecular weight component (A), a relatively high molecular weight component (B) and optionally an ultrahigh molecular weight component (C). Bimodal terpolymer compositions were shown to have values of elongation as high as 535%.

Even though fluoroelastomers have some properties of interest, further development is needed to confirm utility of such materials in cold-shrink applications particularly those requiring fluoroelastomers capable of maintaining an expanded condition over a significant period of time without failing by splitting, which renders them useless.

SUMMARY OF THE INVENTION

The present invention provides a fluoroelastomer composition having mechanical properties suitable for cold-shrink products that resist attack by contaminants present in environments containing hazardous chemical and biological agents. Although fluorine functional polymer materials are known to resist chemical attack, there has been no specific report of the use of flexible fluoropolymers or fluoroelastomers or the like as protective cold-shrink covers similar to the use of terpolymers of well known ethylene, propylene diene monomers (EPDM) disclosed, for example, in U.S. Pat. No. 5,080,942. Cold-shrink articles using EPDM terpolymers have been described as pre-stretched tubes (PST). Current practice for packaging cold-shrink or pre-stretched tubes utilizes an inner plastic core, which holds an elastic sleeve in a pre-stretched condition before use. The core structure may be disrupted, causing it to collapse for withdrawal from inside the PST.

Pre-stretched tubes may be used for protecting and repairing sections of wire or cable. They are often used to protect electrical splices using a procedure including threading of the spliced cable through a support core carrying a PST. The support core has an internal diameter larger than the outer diameter of the cable. When correctly positioned around the cable splice, collapse and removal of the core allows the stretched elastomeric tube to recover, approaching its original size, so that the recovered tube fits snugly as a protective cover over the spliced section of cable.

Cold shrink tubes, described in U.S. Pat. No. 5,080,942 have a desired balance of mechanical properties, particularly percent elongation and permanent set, to satisfy a variety of applications. Preferably an elastomer suitable for cold-shrink applications has hardness below about 60 Shore A, tensile strength greater than 70 Kg/cm$^2$ (1000 psi), elongation greater than 300% and permanent set of 21% or less. Electrical cable splices protected by EPDM cold-shrink tubes have sufficient insulation to maintain the integrity of an electrical signal or power supply under normal circumstances. Under adverse conditions that include heat, oil immersion, or exposure to aggressive chemical and biological agents, protective covers of EPDM may swell or degrade leaving an underlying structure susceptible to attack and failure.

The present invention provides cured fluoroelastomer compositions as an alternative to EPDM terpolymers in cold-shrink articles. As mentioned earlier, fluoroelastomers offer significant resistance to environmental attack. Successful use of fluoroelastomers in cold-shrink applications depends upon either discovering or developing materials that combine the chemical resistance of fluoroelastomers with the mechanical properties of known cold-shrink elastomers. Suitable fluoroelastomers for cold-shrink articles will possess a balance of properties including hardness, tensile strength, elongation and permanent set.

As mentioned earlier, it is possible to prepare fluoroelastomer materials using terpolymers of tetrafluoroethylene, hexafluoropropylene and vinylidene difluoride monomers that, suitably compounded, appear to possess mechanical properties similar to non-fluorinated polymers, such as EPDM. U.S. Pat. No. 5,110,645 describes a fluoroelastomer comprising 100 parts of a fluorinated terpolymer, 0.5 part of a peroxide initiator, 1.5 parts of an isocyanurate curative, 10 parts of a carbon filler and 10 parts of a plasticizer. The plasticizer is described as a copolymer of vinylidene fluoride and hexafluoropropylene. After curing at 160° C. for 10 minutes and 180° C. for four hours, articles in the form of lubes and sheets were described as having hardness of 53, tensile strength of 100 Kg/cm$^2$ (1400 psi), elongation of about 500% and permanent set of 13%. Test procedures were not included in the description. Using the procedure for testing materials of the present invention, it was not possible to reproduce the low values of permanent set presented in the reference (U.S. Pat. No. 5,110,645). Measured values of permanent set (see Comparative Example C4) were closer to 25% than 13%. It was concluded that the plasticized terpolymer of U.S. Pat. No. 5,110,645, while resisting attack by antiseptic and sterilization fluids, is nevertheless unsuitable for cold-shrink products if the permanent set value consistently exceeds the desired value of 21%.

Fluoroelastomer compositions according to the present invention do not use copolymer-plasticized terpolymer compositions for cold shrink applications. Instead it was discovered that a fluorinated terpolymer, could be combined with alternative plasticizers, processing aids, and fillers, to improve physical properties of curable compositions, which, after heating in the presence of a suitable curative, may be formed into articles meeting cold shrink requirements including permanent set. Examples of suitable fillers include reinforcing agents (e.g. thermal grade carbon blacks or non-black pigments), silica, graphite, clay, talc, diatomaceous earth, barium sulfate, titanium oxide, wollastonite and combinations thereof. Other ingredients that may be added to the composition, alone or in combination with one or more fillers, include, for example, lubricants, cure accelerators, pigments, and combinations thereof.

More particularly the present invention provides a cold shrink article including a fluoroelastomer composition comprising a first terpolymer comprising tetrafluoroethylene, hexafluoropropylene and vinylidene difluoride. The first terpolymer has a first weight average molecular weight centered at about 10$^7$ to 10$^8$. A second terpolymer included in the fluoroelastomer composition is a terpolymer of tetrafluoroethylene, hexafluoropropylene and vinylidene difluoride that has a second weight average molecular weight centered at 10$^4$. The first terpolymer combines with the second terpolymer to provide a mixed terpolymer. Other components of the fluoroelastomer composition include a processing aid added in an amount from about 0.5 parts to about 2 parts per 100 parts of the mixed terpolymer, a filler in an amount from about 2 parts to about 15 parts per 100 parts of the mixed terpolymer, an oil in an amount of 10 parts or less per 100 parts of the mixed terpolymer, and a curative. The fluoroelastomer composition upon curing at an elevated temperature provides the cold shrink article having a permanent set value of about 21% or less.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. Details of compositional and performance criteria disclosed herein are not to be interpreted as limiting, but merely as a basis for the claims and as a representative basis for teaching one skilled in the art to variously employ the present invention.

Elastomers including EPDM terpolymers have mechanical properties satisfying the requirements of cold-shrink products. Known cold shrink products are tubular structures used as protective covers for spliced and branched sections of electrical wires and cables. Before installation, a cold-shrink tube is expanded around a support core and held in expanded condition for an extended period of time. The support core design allows it to collapse on demand for removal from inside the cold-shrink tube, which recovers towards its original dimensions as it shrinks around a cable splice.

Useful cold-shrink elastomers, such as EPDM terpolymer rubbers, possess desirable properties of elongation and permanent set. Measurement of permanent set provides an indicator of the capability of a material to recover to substantially its original dimensions after being held in a stretched condition for an extended period of time. Elastic recovery is an important property for cold-shrink applications. For example, typical properties for cold-shrink tubes fabricated using EPDM terpolymer rubbers include elongation >300% and permanent set of 21% or less.

Elastomeric EPDM rubbers have mechanical properties satisfying the needs of cold-shrink applications, but they have limitations if exposed to high temperatures or attack by penetrating fuel oils and chemical and biological hazards. Fuoroelastomers are known to resist attack and damage due to heat and environmentally hazardous materials, but there is no evidence showing the successful use of fluoroelastomers for cold-shrink applications. Mechanical properties reported for commercially available fluoroelastomers include elongation of about 430% and permanent set from about 30% to about 50%. The permanent set value exceeds the previously identified desired maximum value of 21% needed of elastomers meeting cold-shrink requirements.

The use of a high molecular weight fluoroelastomer having a high crosslink density reduces the permanent set to a range between about 23% and 30%, depending on formulation. An increase in molecular weight and crosslink density improves permanent set. Changes in molecular weight and crosslink density also have an adverse effect upon fluoroelastomer elongation, since the polymer becomes more rigid with lowered elongation at break. Addition of selected materials to a fluoroelastomer formulation effects beneficial property adjustment to provide cold-shrink elastomers by overcoming lowering of elastomer elongation A fluoroelastomer composition suitable for use in cold shrink products according to the present invention has a terpolymer composition as a main component. The terpolymer composition, also referred to herein as a mixed terpolymer, has multimodal distribution of molecular weight. This means that the mixed terpolymer contains a number of fluoroterpolymers that may be distinguished from each other by a difference of molecular weight. Preferably a mixed terpolymer has a bimodal distribution of molecular weight produced by mixing a first terpolymer, having a first weight average molecular weight centered from about $10^7$ to about $10^8$, with a second terpolymer having a second weight average molecular weight centered at about $10^4$. The first terpolymer is selected to have a high molecular weight, which could be as high as $10^8$ while the second terpolymer has a relatively low molecular weight. Preferred terpolymers result from interpolymerization of combinations of tetrafluoroethylene, hexafluoropropylene and vinylidene difluoride comonomers. Preparation of terpolymers of differing molecular weight depends upon the relative concentrations of the three monomers and conditions of polymerization.

Methods for preparation of fluoropolymers according to the present invention include, for example, free radical polymerization of monomers. In general the desired olefinic monomers can be copolymerized in an aqueous colloidal dispersion. Aqueous emulsion and suspension polymerizations can be carried out in conventional steady-state conditions in which monomers, water, surfactants, buffers and catalysts are fed continuously to a stirred reactor under optimum pressure and temperature conditions while the resulting emulsion or suspension is removed continuously. Alternative syntheses, as described in U.S. Pat. No. Re. 36,794, include the use a batch or semibatch polymerization process to feed ingredients into a stirred reactor to react at a set temperature for a specified length of time or ingredients may be fed into the reactor to maintain a constant monomer pressure until a desired amount of polymer is formed.

Mooney viscosity provides a convenient measurement corresponding to the magnitude of molecular weight. This measurement may be used for selection of a suitable high molecular weight first terpolymer gum to mix with a low molecular weight second terpolymer gum to form a desired mixed terpolymer gum. Any fluoroterpolymer may be selected for use in cold shrink applications provided that the mixed terpolymer has a Mooney viscosity of about 55 to about 60.

A mixed terpolymer provides the main component for a fluoroelastomer formulated to meet cold shrink requirements. Table 1, below, includes curable formulations that meet cold-shrink tube requirements after crosslinking at elevated temperature. Other components in the formulation include up to about 15% of fillers such as the rutile form of a titanium dioxide pigment in an amount of about 10 parts per 100 parts of the mixed terpolymer and a carbon black in an amount of about 3 parts per 100 parts of the mixed terpolymer. Carbon black may consist of essentially any commercial grade, including large particulate size thermal types, fine reinforcing furnace grades and materials termed conductive carbon black. Preferred carbon blacks having designations N990 MT Black and N110 SAF Black are available from Cabot Corporation, Billerica, Mass.

A processing oil added in an amount of about 10 parts or less, preferably 7 parts or less per 100 parts of the mixed terpolymer acts as a plasticizer reducing the hardness of a cured fluoroelastomer to meet elongation requirements for cold-shrink articles. Polymers of halocarbon monomers such as chlorotrifluoroethylene (CTFE) provide high temperature stable oils suitable for softening terpolymer compositions. A preferred oil is HALOCARBON 95 FLUID available from Halocarbon Products Corporation, River Edge, NJ., Successful use of the present invention requires a processing aid, added in amounts of about 2 parts or less per 100 parts of the mixed terpolymer. The processing aid appears to lower permanent set to 21% and less. Suitable processing aids include Carnauba wax available from Strahl & Pitsch Inc., West Babylon, NY and a stearylamine identified as ARMEEN 18D, available from Akzo Nobel Surface Chemistry LLC, Chicago, Ill. It appears that values of permanent set pass through a minimum with added amounts of Carnauba wax. The lowest value of permanent set appears for a concentration of about 1.5 parts of Carnauba wax per 100 parts of mixed terpolymer.

The fluoroelastomer formulation may be cured (see e.g. U.S. Pat. No. 5,216,085) using a curative or mixture of curatives in an amount of 2.0 parts per 100 parts of mixed terpolymer. Fluoroelastomer gums, obtained via emulsion polymerization, for example, may be cured using conventional methods including the use of nucleophiles such as diamines, polyhydroxy compounds or fluoroaliphatic sulfonamides. For example, the fluoroelastomers of the present invention may be crosslinked using a curative that includes an aromatic polyhydroxy crosslinker, a quaternary phosphonium salt accelerator and a fluoroaliphatic sulfonamide. A fluoroelastomer composition includes a curative compounded with a mixed terpolymer composition. Particularly useful polyhydroxy crosslinkers include 4,4'-thiodiphenol, isopropylidene-bis(4-hydroxybenzene), and hexafluoroisopropylidene-bis(4-hydroxybenzene).

Curing of fluoroelastomer formulations may be accelerated by addition of acid acceptors, such as magnesium oxide and calcium hydroxide. A calcium hydroxide compound may be added in an amount of about 6 parts per 100 parts of the mixed terpolymer, and a magnesium oxide in an amount of about 3 parts per 100 parts of the mixed terpolymer. The curing profile for compositions according to the present invention includes heating a formulation for 30 minutes at 160° C., during application of pressure to form a sheet of cured fluoroelastomer. Sheet formation, also referred to as press cure, provides test samples of cold shrink material and precedes an extended postcure at elevated temperature. Preferred conditions for postcure include 4.0 hours at 149° C. Cold shrink articles, including sheets and tubular constructions, have elongations at break from about 420% to about 620%, preferably about 500% to about 550% and permanent set values less that about 21% preferably from about 18% to about 21%.

Test Methods:

Mooney viscosity was measured according to ASTM D1646 using a 1 minute pre-heat and a 10 minute test at 121° C.

Press Cure samples 76 mm×152 mm×2 mm were produced by heating elastomer formulations at 160° C. for 30 minutes under a pressure of 5 to 10 MPa.

Hardness of cured samples was measured according to ASTM D2240 Method A using a Shore A durometer.

Tensile Strength at Break and Elongation at Break and Percent Modulus of cured samples were measured according to ASTM D412 using Die C at 25° C.

Elastic recovery of a cold-shrink tubular article is important to provide a tube that fits snugly upon removal of the inner support core. A desirable permanent set value is about 21% and less measured as follows:
1) Stabilize an oven at 100° C.
2) Cut dumbbells from the sample to be tested using Die C as for ASTM D-412.
3) Mark 2.54 cms (one inch) parallel bench marks at the approximate center of the sample.
4) Place the dumbbell in the set fixture and stretch the sample until the distance between bench marks is 5.08 cms (2.0 inches). This correlates to 100% strain.
5) Place the loaded set fixture in the oven at 100° C. for 3 hours.
6) After 3 hours remove the fixture from the oven and allow the stretched sample to cool at room temperature (21° C. ±2° C.) for one hour.
7) Remove the sample from the fixture and place the sample on a smooth wooden or cardboard surface. Release the sample gently.
8) After the sample has been out of the fixture for 30±2 minutes, measure and record the distance between the bench marks. Samples may also be checked for further elastic recovery at 60+2 minutes
9) The following equation provides a value of permanent set.

$$\%\text{PERMANENT SET} = \frac{100(rl - ol)}{tl - ol}$$

ri=relaxed length (distance between bench marks after cooling)
ol=original length (2.54 cms)
tl=test length (5.08 cms)
Fluoroterpolymer Preparation:

A solution of dipotassium hydrogen phosphate and a persulfate free radical initiator in water was placed in a pressure reactor. The reactor was evacuated and filled with nitrogen four consecutive times before addition of hexamethyldisilane (HMDS) via syringe, through a septum in an inlet valve. The contents of the reactor, heated to a temperature of 71° C., were stirred using a mechanical stirrer. Reactor pressure increases during charging of a mixture of the three monomers tetrafluoroethylene (TFE), hexafluoropropylene (HFP) and vinylidene difluoride (VDF). After initiation of polymerization the reactor pressure was maintained at a desired level by adding more of the mixture of monomers. After a selected amount of the mixture of monomers had been added, the reaction time was noted and the reactor and contents were allowed to cool to room temperature. Any excess of unreacted mixture of monomers was vented from the reactor.

The resulting latex was coagulated by dripping it into an agitated solution of magnesium chloride hexahydrate in deionized water. The resulting fluoroterpolymer gum was washed four times with an amount of hot, deionized water (75° C. to 80° C.) and the washed gum was dried overnight in a circulating air oven held at a temperature between 90° C. and 100° C.

A high molecular weight gum was prepared as above using a 3,800 liter reactor containing 3,158 kg deionized water, 10.5 kg dipotassium hydrogen phosphate, 8.5 kg FC-128 emulsifier and 11.8 kg of ammonium persulfate. The chain transfer agent (HMDS) was omitted from this polymerization reaction. Reactor pressure was maintained constant at 0.98 MPa during addition of 1,203 kg of a monomer mixture of 23.8 wt % TFE, 42.3 wt % HFP and 33.9 wt % VDF. The reaction time was five hours and the resulting gum had an inherent viscosity of 0.705.

A low molecular weight gum was prepared as above using a 3,800 liter reactor containing 3,158 kg deionized water, 10.5 kg dipotassium hydrogen phosphate, 12.7 kg HMDS, 8.5 kg FC-128 emulsifier and 11.8 kg of ammonium persulfate. Reactor pressure was maintained constant at 0.90 MPa during addition of 1,203 kg of a monomer mixture of 23.8 wt % TFE, 42.3 wt % HFP and 33.9 wt % VDF. The reaction time was nine hours and the resulting gum had an inherent viscosity (IV) of 0.165.

Table 1, provides Examples 1–8 according to the present invention. Each example uses the same mixed terpolymer "A" that has a Mooney viscosity of about 55 to about 60. The value of Mooney viscosity depends upon the relative concentrations and molecular weights of a first, high molecular weight fluoroterpolymer gum mixed with a second fluoroterpolymer gum of lower molecular weight. The first fluoroterpolymer gum preferably has a molecular weight centered at about $10^7$ to about $10^8$ and the second fluoroterpolymer gum preferably has a molecular weight centered at $10^4$. A cold shrink formulation according to the present invention comprises a mixed terpolymer gum-A having a bimodal distribution of 70 wt % of the high molecular weight first terpolymer gum mixed with 30 wt % of the lower molecular weight second terpolymer gum. Table 1 provides amounts of components based upon the number of parts of a given component added to 100 parts of mixed terpolymer gum-A.

TABLE 1

Fluoroelastomer Formulations

| Example | 1 | 2 | 3 | 4 | 5 | 6 | 7 | 8 |
|---|---|---|---|---|---|---|---|---|
| Mixed Terpolymer A Mooney viscosity = 58 | 100 | 100 | 100 | 100 | 100 | 100 | 100 | 100 |
| Akrochem TiO$_2$ (rutile) | 10 | 10 | 10 | 10 | 10 | 10 | 10 | |
| N110 SAF Black | 3 | 3 | 3 | 3 | 3 | 3 | 3 | |
| N990 MT Black | | | | | | | | 20 |
| Calcium Hydroxide HP | 6 | 6 | 6 | 6 | 6 | 6 | 6 | 6 |
| Elastomag 170 | 3 | 3 | 3 | 3 | 3 | 3 | 3 | 3 |
| Carnauba Wax | 1 | 1 | 1.5 | 2 | | | 1.5 | |
| ARMEEN 18D | | | | | 1 | 1 | | |
| Curative (40% active) | 2.0 | 2.0 | 2.0 | 2.0 | 2.0 | 2.0 | 2.0 | 2.0 |
| Halocarbon 95 Fluid | 2.5 | 5 | 5 | 5 | | 2.5 | 7 | 10 |
| Formula weight | 125.7 | 128.2 | 129.0 | 129.2 | 123.2 | 125.7 | 130.7 | 139.2 |

Sample preparation included press cure for 30 minutes at 160° C., followed by post curing test sheets for four hours at 149° C. Table 2 provides the results of cold shrink sample testing.

TABLE 2

Cold-Shrink Testing Results

| Example | 1 | 2 | 3 | 4 | 5 | 6 | 7 | 8 |
|---|---|---|---|---|---|---|---|---|
| Hardness (Shore A, pts) | 55 | 55 | 53 | 52 | 53 | 52 | 50 | 61 |
| Tensile (Kg/cm$^2$) | 143.6 | 133.0 | 130.0 | 124.5 | 113.5 | 133.4 | 142.2 | 109.6 |
| Elongation (%) | 544 | 523 | 530 | 542 | 438 | 500 | 617 | 475 |
| 100% modulus (Kg/cm$^2$) | 14.0 | 13.1 | 13.4 | 13.2 | 14.1 | 12.7 | 11.3 | 17.6 |
| 200% modulus | 32.1 | 30.5 | 29.5 | 29.5 | 34.2 | 29.7 | 23.8 | 40.4 |

TABLE 2-continued

Cold-Shrink Testing Results

| Example | 1 | 2 | 3 | 4 | 5 | 6 | 7 | 8 |
|---|---|---|---|---|---|---|---|---|
| (Kg/cm$^2$) | | | | | | | | |
| 300% modulus (Kg/cm$^2$) | 60.9 | 58.6 | 54.9 | 54.3 | 66.7 | 61.8 | 43.7 | 67.9 |
| Permanent set (%), 30 min. | 20.3 | 20.1 | 19.1 | 19.8 | 21.0 | 20.8 | 20.4 | 20 |
| Permanent set (%), 60 min. | 19.2 | 18.4 | 18.3 | 18.3 | 18.6 | 18.5 | 19.8 | — |

Table 3 contains information for comparative examples of fluoroelastomers that do not meet the desired level of permanent set of 21% or less. Formulations of comparative examples C1–C3 were similar to Examples 1–8 in using mixed terpolymer gum-A. These comparative examples differ from examples according to the present invention by a change in amount or omission of either Carnauba wax or ARMEEN 18D. These changes or omissions are sufficient to raise permanent set values above the upper maximum desired level of 21%.

Comparative example C4 shows the results of preparing a fluoroelastomer formulation based upon the teachings of U.S. Pat. No. 5,110,645. When tested using the same procedures as those used for Examples 1–8, the cured material of C4 had significantly lower values of tensile, elongation, 200% modulus and 300% modulus. While the curing profile for C1–C3 was the same as for Examples 1–8 the post cure of C4 followed the requirements of the reference (U.S. Pat. No. 5,110,645), i.e. 180° C. for four hours.

TABLE 3

Comparative Fluoroelastomer Formulations

| Example | C1 | C2 | C3 | C4 |
|---|---|---|---|---|
| Mixed Terpolymer A Mooney viscosity = 58 | 100 | 100 | 100 | |
| Daikin G-902 | | | | 100 |
| Halocarbon 95 Fluid | 5 | 5 | 2.5 | |
| Daikin G-101 | | | | 10 |
| Akrochem TiO$_2$ (rutile) | 10 | 10 | 10 | |
| N110 SAF Black | 3 | 3 | 3 | |
| N-990 MT Carbon | | | | 10 |
| Calcium Hydroxide HP | 6 | 6 | 6 | |
| Elastomag 170 | 3 | 3 | 3 | |
| Carnauba Wax | | | 3 | |
| Curative (40% active) | 2.0 | 2.0 | 2.0 | |
| Perhexa 25B-DLC (40% active) | | | | 0.5 |
| TAIC-DLC (72% active)* | | | | 2.1 |
| Formula weight | 127.2 | 130.2 | 124.7 | 122.6 |

*Tri allyl isocyanurate

TABLE 4

Comparative Cold-Shrink Testing Results

| Example | C1 | C2 | C3 | C4 |
|---|---|---|---|---|
| Hardness (Shore A, pts) | 53 | 53 | 53 | 57 |
| Tensile (Kg/cm$^2$) | 144.7 | 121.0 | 144.2 | 83.7 |
| Elongation (%) | 550 | 532 | 545 | 467 |
| 100% modulus (Kg/cm$^2$) | 12.3 | 14.2 | 12.0 | 14.2 |
| 200% modulus (Kg/cm$^2$) | 27.1 | 33.5 | 26.3 | 20.9 |
| 300% modulus (Kg/cm$^2$) | 55.5 | 57.7 | 55.8 | 34.9 |
| Permanent set (%), 30 min. | 24.8 | 23.8 | 23.8 | 25.5 |
| Permanent set (%), 60 min. | 22.2 | 21.4 | 20.8 | 25.1 |

A cured fluoroelastomer preferably has a measured elongation >430% so that the polymer can be suitably stretchable for cold shrink applications. The use of a halocarbon process oil has a softening effect that provides a level of hardness to maintain the elongation of the fluoroelastomer in the desired range.

The addition of processing aids such as Carnauba Wax and ARMEEN 18D has the effect of reducing permanent set to 21% or less. Since permanent set is a measure of elastic recovery this property has particular significance to material selection for cold-shrink applications. The addition of processing aids appears to bring added softness to the fluoroelastomer. As indicated in Table 2, controlled amounts of Carnauba Wax provide 30 minute permanent set values equal to or lower than 21%. Examples 1–4 and 7 show that levels of Carnauba Wax below 2 parts per 100 parts of the mixed terpolymer provide cured fluoroelastomers having permanent set values from 19.1 to 20.4 after 30 minutes recovery time and from 18.3 to 19.8 after sixty minutes of recovery time. A distinguishing feature of cold-shrink fluoroelastomers is the fact that they continue to recover after the normal 30 minutes measurement time for the permanent set test method. The addition to Tables 2 and 4 of a 60 minutes measurement confirms that examples 1–7 continue to recover for some time after being released from the stretching frame.

As required, details of the present invention are disclosed herein; however, it is to be understood that the disclosed embodiments are merely exemplary to provide a basis for the claims and an information source for teaching one skilled in the art to variously employ the present invention.

What is claimed is:

1. A cold shrink article including a fluoroelastomer composition comprising:
   a first terpolymer comprising tetrafluoroethylene, hexafluoropropylene and vinylidene difluoride, said first terpolymer having a first weight average molecular weight centered from about 10$^7$ to about 10$^8$;
   a second terpolymer comprising tetrafluoroethylene, hexafluoropropylene and vinylidene difluoride, said second terpolymer having a second weight average molecular weight centered at about 10$^4$, said first terpolymer combined with said second terpolymer to provide a mixed terpolymer;
   a processing aid in an amount from about 0.5 parts to about 2 parts per 100 parts of said mixed terpolymer;
   a filler in an amount from about 2 parts to about 15 parts per 100 parts of said mixed terpolymer;
   an oil in an amount of 10 parts or less per 100 parts of said mixed terpolymer; and
   a curative;
   said fluoroelastomer composition upon curing at an elevated temperature provides said cold shrink article having a permanent set value of 21% or less.

2. The cold shrink article of claim 1, wherein said cold-shrink article has an elongation from about 420% to about 620%.

3. The cold shrink article of claim 2, wherein said elongation is from about 500% to about 550%.

4. The cold shrink article of claim 1, wherein said mixed terpolymer forms by combining 70 wt % of said first terpolymer with 30 wt % of said second terpolymer.

5. The cold shrink article of claim 1, wherein said processing aid is selected from the group consisting of waxes and amines.

6. The cold shrink article of claim 5, wherein one of said waxes is carnauba wax.

7. The cold shrink article of claim 5, wherein one of said amines is stearylamine.

8. The cold shrink article of claim 1, wherein said filler is a reinforcing filler.

9. The cold shrink article of claim 8, wherein said reinforcing filler is selected from the group consisting of metal oxide and carbon black and mixtures thereof.

10. The cold shrink article of claim 1, wherein said amount of said oil is about seven parts or less per 100 parts of said mixed terpolymer.

11. The cold shrink article of claim 1, wherein said amount of said oil is about five parts or less per 100 parts of said mixed terpolymer.

12. The cold shrink article of claim 1, wherein said oil is a halocarbon oil.

13. The cold shrink article of claim 12, wherein said halocarbon oil is cholorotrifluoroethylene.

14. The cold shrink article of claim 1, wherein said fluoroelastomer composition further comprises from about 2 parts to about 10 parts per 100 parts of said mixed terpolymer of at least one acid acceptor.

15. The cold shrink article of claim 14, wherein said acid acceptor is selected from the group consisting of metal oxide and metal hydroxide and mixtures thereof.

16. The cold shrink article of claim 1, wherein said fluoroelastomer composition includes said curvative in an amount of 2.0 parts per 100 parts of said mixed terpolymer.

* * * * *

UNITED STATES PATENT AND TRADEMARK OFFICE
CERTIFICATE OF CORRECTION

PATENT NO.    : 6,838,512 B2
DATED         : January 4, 2005
INVENTOR(S)   : Eggers et al.

It is certified that error appears in the above-identified patent and that said Letters Patent is hereby corrected as shown below:

Column 3,
Line 35, delete "lubes" and insert -- tubes --, therefor.

Column 5,
Line 7, after "elongation" insert -- . --.

Column 6,
Line 9, after "NJ." delete ",".
Lines 9-12, after "NJ.," delete "Successful use of the present invention requires a processing aid, added in amounts of about 2 parts or less per 100 parts of the mixed terpolymer. The processing aid appears to lower permanent set to 21% and less. Suitable processing aids include Carnauba wax available from Strahl & Pitsch Inc., West Babylon, NY and a stearylamine identified as ARMEEN 18D, available from Akzo Nobel Surface Chemistry LLC, Chicago, Ill. It appears that values of permanent set pass through a minimum with added amounts of Carnauba wax. The lowest value of permanent set appears for a concentration of about 1.5 parts of Carnauba wax per 100 parts of mixed terpolymer." and insert the same in line 10 as a new paragraph.

Column 7,
Line 23, delete "60+2" and insert -- 60 ± 2 --, therefor.
Line 23, after "minutes" insert -- . --.
Line 29, delete "ri" and insert -- rl --, therefor.

Column 12,
Line 10, delete "curvative" and insert -- curative --, therefor.

Signed and Sealed this

Twenty-eighth Day of June, 2005

JON W. DUDAS
*Director of the United States Patent and Trademark Office*